March 7, 1961　　H. J. SMITH ET AL　　2,973,647
ACCELEROMETERS
Filed Feb. 15, 1957　　2 Sheets-Sheet 2
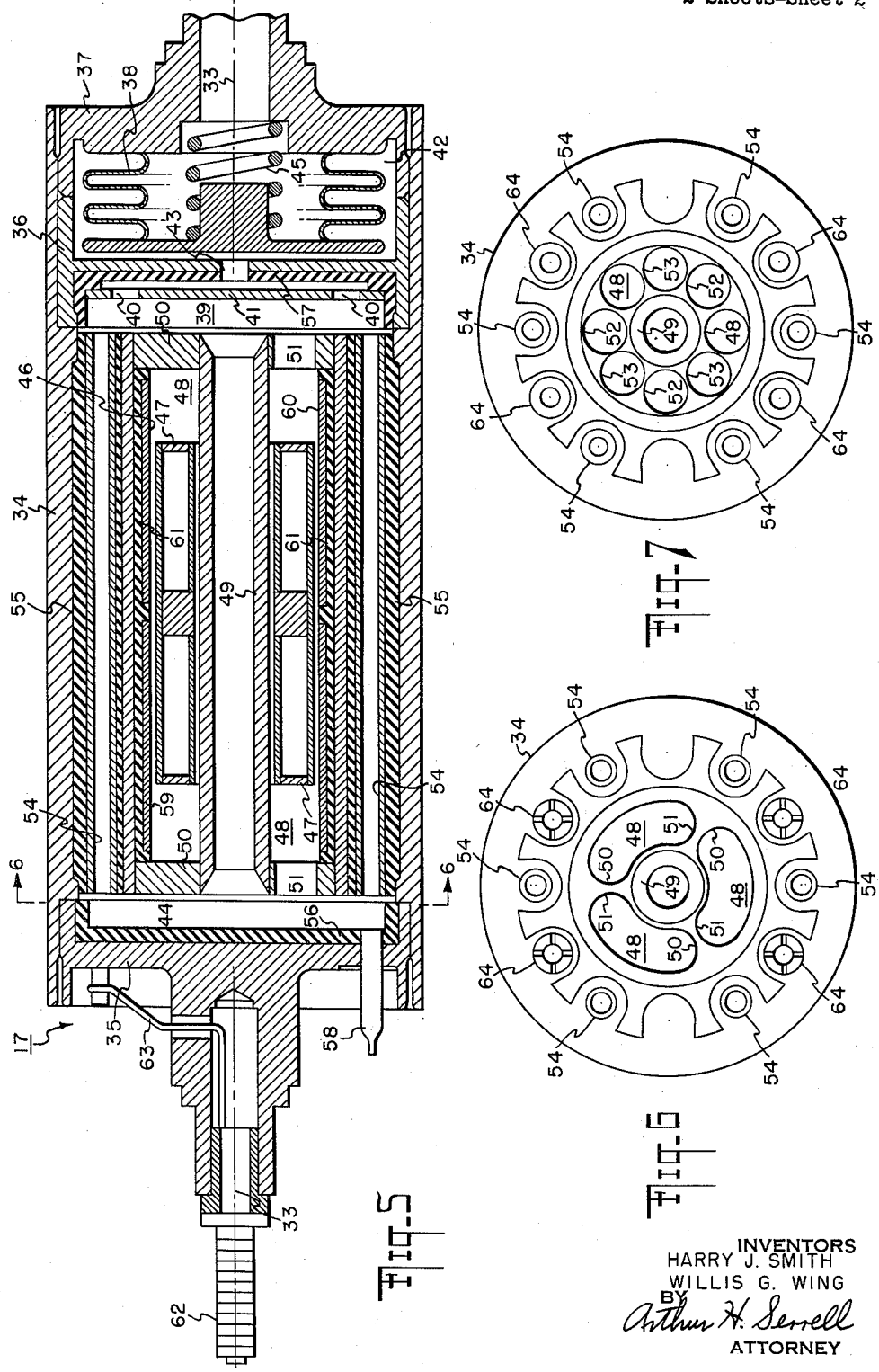
INVENTORS
HARRY J. SMITH
WILLIS G. WING
BY
Arthur H. Serrell
ATTORNEY United States Patent Office 2,973,647
Patented Mar. 7, 1961

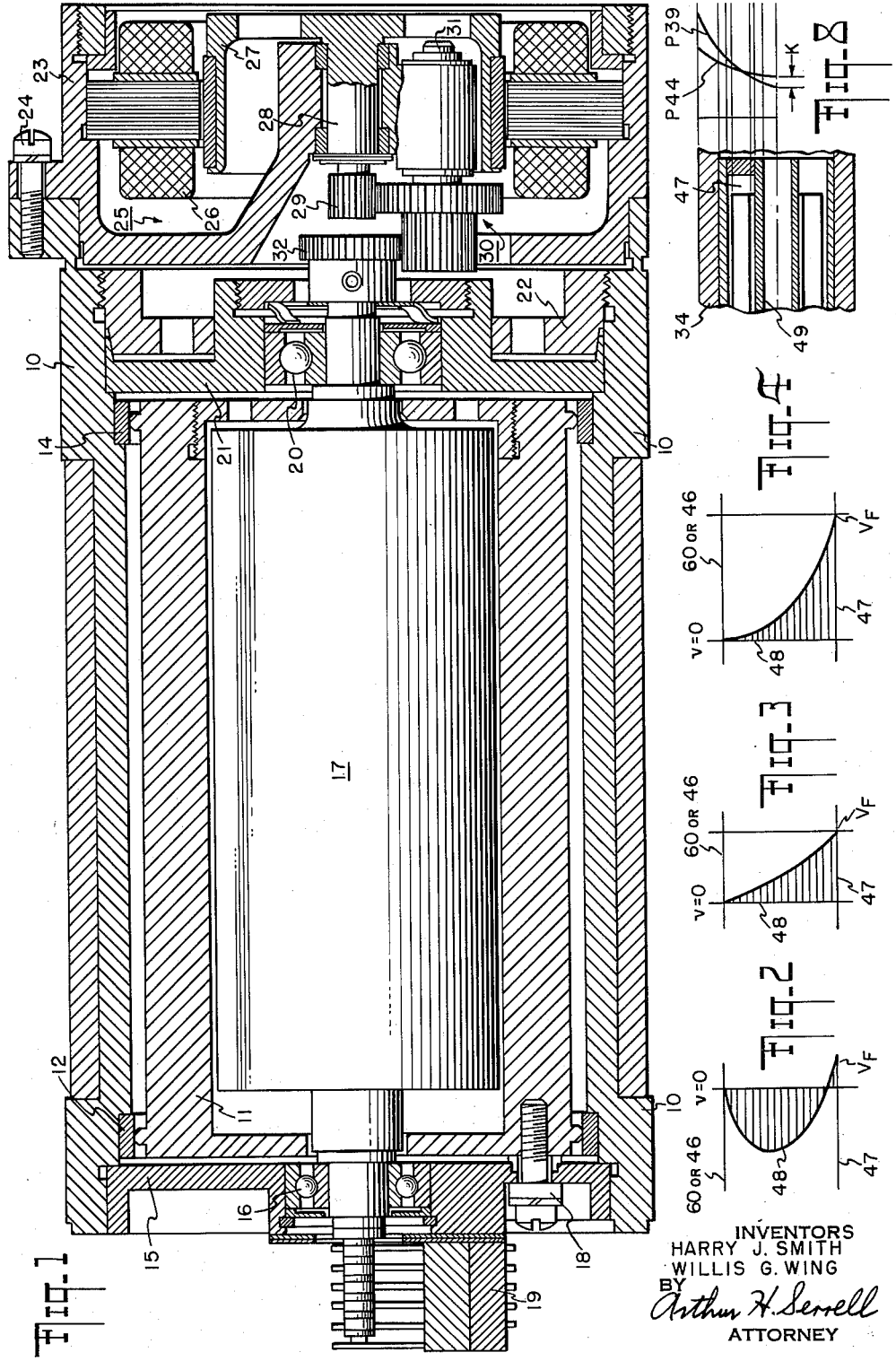

2,973,647

ACCELEROMETERS

Harry J. Smith, Glen Head, and Willis G. Wing, Roslyn Heights, N.Y., assignors to Sperry Rand Corporation, a corporation of Delaware Filed Feb. 15, 1957, Ser. No. 641,433

12 Claims. (Cl. 73—497)

This invention relates to an improvement in acceleration sensing devices or accelerometers of the character in which an annular mass is located with predetermined clearance between two, radially spaced, concentric cylindrical parts of a fluid filled closed container, the mass responding to acceleration by movement along the axis of the cylindrical parts of the container. The invention more particularly relates to an improvement in accelerometers of the integrating type shown and described in U.S. Letters Patent No. 2,840,366, issued June 24, 1958 to Willis G. Wing. In such an instrument, the container is continuously rotated about the axis defined by the cylindrical parts during use. The structure of the mass and the fluid in the container are also such that the mass is floatably supported by the fluid as it rotates with rotation of the container. The axis of the sensitive element or annular mass corresponds to the axis of the cylindrical components of the fluid filled rotating container.

The accuracy of this type of accelerometer is critically dependent upon the thickness of the gaps or predetermined clearances between the surfaces of the annular float and the juxtaposed concentric cylindrical parts of the container. Any taper in either of the cylindrical parts of the container or eccentricity in the surface of the float mass relative to its axis that resutls in more than a very minute change in the gap width required provides non-linearity known as scale factor error in the output of the instrument. This accuracy must be maintained throughout the length of the entire travel of the sensitive float within the container. Manufacture of the accelerometers on a quantity production basis is presently obviated due to the fact that the dimensional accurateness required of the components is presently beyond that now provided by the most precise machining operations. The object of the present invention is to obviate this condition so that accelerometers of this character that are compensated for scale factor and thermal gradient errors can be manufactured in mass production quantities by the machining methods now available.

Devices of this character are also subject to error due to thermal gradient conditions such as exist where there is a difference in the temperature of the fluid at the respective ends of the container on opposite sides of the float mass. Such temperature differences arise even with the use of fluid heater means in the structure such as shown in the heretofore identified patent to Wing, the same resulting in a difference between the fluid densities and corresponding pressures at the sides of the float mass to cause axial motion of the mass as a result of thermal circulation of the fluid within the container. Errors in the output of the instrument due to the effect in the float mass of thermal circulation of the fluid in the container are known as thermal gradient errors. A further object of the present invention is to provide an improved accelerometer that is compensated for thermal gradient errors.

A feature of the invention resides in the inclusion in the fluid filled container element of an accelerometer of passageway means of predetermined size providing a fluid bypass around the area of the container in which the axially movable sensitive element is located to obtain compensation for scale factor errors.

Other objects and features will become apparent from the specification in connection with the accompanying drawings showing a preferred embodiment of the invention in which, Fig. 1 shows an embodiment of the improved accelerometer in which the housing element is in vertical section and the fluid container element is in side elevation;

Figs. 2, 3 and 4 are schematic fluid flow plots in one of the areas between the sensitive element and one of the cylindrical parts of the container that are used in explaining scale factor compensation;

Fig. 5 is an enlarged vertical section of the container element of the accelerometer shown in Fig. 1;

Fig. 6 is a section taken on line 6—6, Fig. 5;

Fig. 7 is a view similar to Fig. 6, showing a modification of the structure between the tube and bore components of the container, and Fig. 8 is a schematic view and related plot used in explaining thermal gradient compensation.

With reference to Fig. 1, the illustrated accelerometer includes a housing 10 in the form of a tube that is attached in any suitable manner to the vehicle on which the instrument is to be used. The stationary part of the device includes an internal concentric tubular component 11 that is fixedly mounted within the housing 10 by means of two axially spaced heat insulating rings 12 and 14. As shown, a circular end plate 15 is suitably mounted at one end of the tubular housing 10. Plate 15 contains a hub part on which the outer race of one of the bearings 16 that support the fluid containing member 17 of the device for rotation about an axis is mounted. The internal tube 11 is also secured within the housing 10 by a number of threaded connectors such as the bolt piece 18 shown in Fig. 1. A holding piece 19 for a number of parallel electric brushes is also suitably mounted on the exterior of the hub portion of the end plate 15. The second bearing 20 supporting the container 17 for rotation within the housing 10 has its outer race mounted in the hub part of a second circular plate 21. As shown, the plate 21 is fixedly mounted within the housing 10 by a locking plate 22 that is secured to the housing by an internal threaded connection. The right hand end of the housing structure, as viewed in Fig. 1, is provided by a closed end cylindrical motor housing 23 which makes a slide fit connection with the housing part 10. As shown in Fig. 1, these parts are secured together by a number of bolt pieces, one of which is indicated at 24. The housings 10 and 23 are preferably constructed with the same external diameter. The means for rotating the container member 17 about the axis defined by bearings 16 and 20 is shown in Fig. 1 as a suitable alternating current induction motor 25 whose wound stator 26 is suitably mounted within the housing 23. The rotor 27 of motor 25 is suitably journaled in the housing 23, the stub shaft 28 thereof being drivably connected to the closed container 17 by way of pinion 29 on shaft 28, speed reduction gears 30 on stub shaft 31 in the housing 23, and the meshing pinion 32 that is fixedly secured to an extension of the portion of the container 17 journaled in the bearing 20. The spin axis of the container member 17 is indicated at 33—33 in Fig. 5.

With reference to Fig. 5, the rotating container 17 shown is provided by an exterior cylindrical shell or tube 34 with a cap 35 closing the left hand end of the same as viewed in this figure. The right hand end of the shell member 34 is closed by a vented cap 36 and an abutting closed end cap 37 with an internal bellows 38 therein. The fluid chamber 39 at the right hand end of the closed container 17 defined by the cap 36 is vented to the compartment 42 within the container having the bellows 38 therein by way of ports 40 in a disc 41 and a central port 43 in the cap 36. As shown, the disc 41 is axially spaced from the end wall of the cap 36 by a suitable flange structure to provide a communicating chamber between end chamber 39 and the bellows compartment 42. By construction, the end chamber 44 provided in the cap 35 is of the same size as the chamber 39 defined by the cap 36 and disc 41. As shown, a spring 45 biases the bellows 38 in an expanded position within the compartment 42. The purpose of the bellows in the improved instrument is to facilitate change in volume of the fluid, such as silicone oil, that fills the container with changes in the temperature thereof. Means bearing no relation to the present invention and accordingly not shown herein, are independently provided to thermostatically control a supply of heat to the instrument so that the temperature of the fluid is uniformly controlled within limits at a desired average temperature that is above that encountered in the earth's atmosphere. The heat insulating rings 12 and 14 of the instrument are provided to prevent loss of the heat provided within the container member 17 to the atmosphere. The bellows 38 expands or contracts with reverse changes in volume of the fluid, as the same changes temperature within the designed limits. The end caps 35 and 36 provide fluid chamber parts located at the respective ends of the container member 17.

The housing 34 of the fluid filled, closed container 17 provides a structural part with an internal bore 46 that is concentric to the axis 33—33 and defines the outside circular wall of an annular chamber in which the float mass 47 of the instrument is located. The inside wall of the float containing chamber 48 is determined by an internal cylindrical or tube part 49. The bore and cylindrical parts 34 and 49 are concentric, the common axis thereof being the rotating axis 33 of the member 17. The described component provides a member 17 with closed end, concentric internal bore and connected interior cylindrical parts respectively 35, 36; 34, 46; and 49 that constitutes a fluid filled container which is rotated about axis 33—33 by the motor 25 contained in the motor housing 23.

The sensitive element of the combination is provided by the float mass indicated at 47. As shown, the acceleration sensing element 47 is a hollow two-part annular shell that is located in the chamber 48 between the bore and cylindrical or tube parts of the member 17 with predetermined clearance therewith in accordance with the teaching of the Wing patent. The rotating mass 47 is floated by the fluid filling the container to move along its longitudinal axis which corresponds to the axis 33—33 of the instrument in accordance with the influence of acceleration thereon. The float mass 47 is constructed of material providing electrical conductivity as it also functions as the movable component of a two-part electric pick-off which provides the output of the instrument. The pick-off means of the device provides a velocity signal output with displacement of the sensitive element from a null axial position with relation to the member 17. The annular mass 47 is floated by the fluid in the container 17 and located therein with predetermined clearances between the internal bore and interior cylindrical or tube parts of the member to move along the axis 33—33 which corresponds to either the axis of the cylindrical or tube parts. The annular chamber 48 connects the axially spaced, end chambers 39, 44.

In accordance with the present inventive concepts, a connection is provided between the ends of the cylindrical or tube part 49 and the bore part 34 having openings therein venting the fluid in the chamber area 48 with the mass 47 therein to the respective fluid chambers 44, 39 in the end or cap parts 35, 36. As shown in Fig. 6, this connection is provided by a plurality of three equiangular spaced spokes 50 of equal size directed radially of the axis 33—33 at each end of the tube 49. The openings 51 between the spoke parts 50 define passageways of predetermined area that connect the chamber 48 containing the float mass 47 with the respective end chambers 44 and 39. In the modification of the structure shown in Fig. 7, equivalent openings are provided in the connection between the bore and tube parts of the member 17 by a plurality of eight equiangularly spaced and axially located ports 52 of circular cross section. The radial spokes 53 connecting the concentrically spaced bore and tube components in this structure are eight in number. The described openings 51 or 52 define a portion of the passageway, means provided in accordance with the teaching of the present invention to bypass fluid around the chamber area 48 of the container along which the float mass 47 moves to compensate the device for both thermal gradient and scale factor errors.

As shown in Fig. 5, the vents or passageways providing the fluid bypass to the outside of the chamber 48 are located in the bore containing part 34 and the cylindrical or tube part 49. The passageways in the respective noted parts connect the chambers 44 and 39 at the ends of the container and permit circulation of the fluid around the defined chamber 48 in which the rotating mass 47 floats. The passageways in the bore part of the container are provided by a plurality of equiangularly spaced and axially located channels of transverse circular cross section or tubes 54 of the same axial length as the cylindrical part or tube 49. As shown in Figs. 6 and 7, there are six of such noted open ended tubes connecting the fluid chambers 44 and 39. The respective tubes 54 are each covered by a heat insulating sleeve 55, the tubes and sleeves being located in the respective axially extending bores provided to receive the same in the bore part 34 of the container. The described bypass passageways are of predetermined size, the same connecting chambers 44 and 39 to facilitate circulation of fluid from the chamber containing the higher fluid pressure to the one containing the lower fluid pressure.

The vent in the cylindrical part 49 is provided by its tubular structure, the same being open ended and having no internal obstructions. The bypass passageway for the fluid provided by the part 49 is inside of the annular chamber 48 and connects the end chambers 44, 39 along the axis 33—33 of the instrument. The inside diameter of the tube part 49 is of predetermined size, the same functioning in the manner of tubes 54 to facilitate circulation of the fluid filling the container between the axially spaced chambers 44 and 39. The internal inserts 56 and 57 fitting the respective end caps 35 and 36 are constructed of heat insulating material. It will be understood that the container 17 is entirely filled with a suitable viscous type fluid such as silicone oil. The pinch tube through which the degassed fluid is inserted in the container 17 is indicated at 58 in Fig. 5.

The pick-off means illustratively shown herein is a capacitive type of the character described in the hereinbefore-noted Wing patent. As shown in Fig. 5, the internal wall provided by the bore component of the container structure is defined by two axially spaced rings 59 and 60 of electrically conductive material that fit in an insulating sleeve 61 fitted within the bore part 34. Tube part 49 of the structure is an electrical conductor whose end connections 50 are insulated from the spaced conducting rings 59 and 60 by the sleeve 61. Alternating current electrical energy from a suitable source is supplied to the condenser plates or rings 59, 60 by way of suitable brushes on the brush holder 19, the conductors on the slip ring segment 62 that rotates with the container 17 and suitable insulated leads, one of which is indicated at 63. As shown in Figs. 6 and 7, four axial openings 64 are provided in the member 34 to receive the insulated leads, the leads in two of the openings connecting the respective rings 59 and 60. The other two openings contain insulated leads connected to the conducting tube 49 that carry the output signal of the pick-off. The electrically conductive float mass 47 of the combination is a component of the pick-off means, the same operating with movement thereof from a null or central position with relation to condenser plate rings 59, 60 with the chamber 48 to vary the capacitive reactance between such plates and the relatively fixed plate as provided by the conductor tube or cylinder 49.

In explanation of the theory of the invention as it applies to scale factor error compensation, it is first assumed that the accelerometer shown in Fig. 5 contains no bypass channels whatever. If the float mass 47 moves to the right as viewed in this figure in chamber 48, a plot of the fluid velocity in the gap will have the general appearance shown in Fig. 2 where the velocity of the fluid at the surface 60 or 46 is zero. At the other end of the curve, the designation $V_f$ indicates that the fluid at the surface of the float mass is travelling in the same direction and at the same speed as the float mass 47. It can be readily demonstrated that the hydraulic retarding force acting on the float mass is very nearly proportional to the third power of the reciprocal gap thickness. This retarding force is equal to the sum of the viscous shear force on the outside diameter of the float mass 47 plus the pressure forces on the respective ends of the mass. The retarding force governs the float mass velocity and hence the scale factor of the instrument. The fact that it varies inversely with the gap thickness cubed accounts for the extreme sensitivity of the scale factor to the average gap dimension.

Next, an accelerometer structure is assumed wherein the housing is an infinitely large container of fluid in which the opposite ends of the chamber 48 are connected by infinite fluid passageways. With reference to Fig. 3, the illustrated plot of fluid velocity in the gap shows that no fluid is returned through the gap as indicated in Fig. 2, because, in this instance, the fluid will follow the path of zero impedance around the outside of the gap through the infinite fluid passageways. In this case, the total hydraulic retarding force, with the float mass moved to the right as viewed in Fig. 5, consists only of the viscous shear along the cylindrical surface of the mass 47. The end pressure force is theoretically zero since no pressure difference is required to transfer the fluid around the outside of the area containing the mass 47, the same being a zero impedance path in this instance. Variation in the gap dimension alters the slope of the velocity curve shown in Fig. 3 and hence the shear force on the float mass 47 is in inverse proportion to the first power of the gap thickness.

In accordance with the present inventive concepts elimination of the taper difficulty is obtained by selecting a bypass impedance for the accelerometer instrument which is between the infinity demonstrated in the second example and the zero demonstrated in the first example. The reciprocal of impedance is admittance and such admittance value is selected at a point where a small change in gap dimension has no effect on scale factor error. This is graphically illustrated in the fluid velocity plot of Fig. 4 which is in essence a combination of the curves of Figs. 2 and 3. It is noted, however, that at the upper portion of the curve in Fig. 4 in the vicinity of the surface 60 or 46, the fluid velocity is zero and remains zero over a small fraction of the gap thickness. This demonstrates that small changes in dimensions of the spaced related components does not result in a change in the flow pattern in the gap. Accordingly, compensation is made for scale factor errors by the provision of one or more bypass passageways around the annular chamber of the member in which the sensitive element 47 moves, such bypass being provided by passageways of predetermined transverse cross sectional area.

To provide for thermal gradient compensation, passageways in both the cylindrical parts 49 and 34 are required to circulate the fluid between the chambers 44 and 39. These bypass channels are provided in the structure shown in the tube 49 and the tube 54. The total transverse cross sectional area of the openings connecting the chambers 44 and 39 must be such as to provide the required admittance for scale factor compensation but here the bypasses are subdivided in proper dimensional ratio between the inside passageway in the inner cylindrical or tube part 49 and the outside passageway in the outer cylindrical bore part 34 of the structure. The basis of this apportionment is indicated in the plot shown in Fig. 8 in relation to the structure adjacent chamber 39. If the density of the fluid in the chamber 44 of the instrument is less than that in the chamber 39 owing to temperature difference, the fluid pressure versus radius resulting from centrifugal action of the member 17 is shown by the curves $P_{44}$ and $P_{39}$. These curves are laterally displaced from one another by an amount K which depends on the admittance of the various axial bypass passageways in the instrument. The net result of this pressure distribution is a circulatory fluid flow from chamber 44 to chamber 39 through tube 49 and from chamber 39 to chamber 44 in the tubes 54 since the pressure in chamber 44 was chosen as greater than that in chamber 39 in this example. The size and accordingly the admittance of the respective passageways are so proportioned that these forces add to zero at the crossover point of the curves which is adjacent the float mass chamber 48 so that no float motion will occur as a result of thermal circulation within the instrument.

While we have described our invention in its preferred embodiments, it is to be understood that the words which we have used are words of description rather than of limitation and that changes within the purview of the appended claims may be made without departing from the true scope and spirit of our invention in its broader aspects.

What is claimed is:

1. An accelerometer comprising a housing, a closed member mounted for rotation about an axis within said housing having axially spaced, end chambers, an annular chamber in said member concentric to the axis connecting the spaced end chambers, a passageway in the member to the inside of the annular chamber connecting the spaced end chambers, a passageway in the member to the outside of the annular chamber connecting the end chambers, a fluid filling the chambers and passageways of said closed member, means for rotating said member about its axis, an annular sensitive element located in the annular chamber of said member with predetermined clearances therewith supported by the fluid in a floating condition for movement along the axis, and pick-off means for providing a signal output with displacement of the sensitive element from a null axial position with relation to said member, the passageways and connecting end chambers providing a scale factor and thermal gradient correcting fluid bypass around the annular chamber, the first of which is determined by the transverse cross sectional area of the passageways and the second of which is determined by the ratio between the relative transverse cross sectional areas of the inside and outside passageways.

2. An accelerometer of the character claimed in claim 1, in which the axially spaced, end chambers are of equal size, and the inside fluid bypass passageway connecting the end chambers is of circular transverse cross section with an axis coincident with the axis of the member, the axial length of the passageway substantially corresponding to the axial length of the anular chamber.

3. An accelerometer of the character claimed in claim 1, in which the axially spaced, end chambers are of equal size, and the outside fluid bypass passageway connecting the end chambers is provided by a plurality of equi-angularly spaced, parallel tubes of axial lengths substantially corresponding to the axial length of the annular chamber.

4. In an accelerometer, a housing, a closed member mounted for rotation about an axis within said housing having axially spaced, end chambers of equal size, an annular chamber in said member concentric to the axis connecting the spaced end chambers, a passageway in the member to the inside of the annular chamber connecting the spaced end chambers, a passageway in the member outside of the annular chamber connecting the spaced end chambers, a fluid filling the chambers and passageways of said closed member, and a sensitive element located in the annular chamber of said member with predetermined clearances therewith supported by the fluid in a floating condition for movement along the axis, the passageways and connecting end chambers providing a scale factor correcting fluid bypass around the annular chamber, the scale factor correction being determined by the transverse cross sectional area of the passageways.

5. An accelerometer of the character claimed in claim 4 in which the inside fluid bypass passageway is of circular transverse cross section with an axis coincident with the axis of the member.

6. An accelerometer of the character claimed in claim 4, in which the outside fluid bypass passageway is provided by a plurality of equiangularly spaced, parallel tubes of axial lengths substantially corresponding to the axial length of the annular chamber.

7. In an accelerometer, a housing, a closed member mounted for rotation about an axis within said housing having axially spaced, end chambers of equal size, an annular chamber in said member concentric to the axis connecting the spaced end chambers, a passageway in the member to the inside of the annular chamber connecting the spaced end chambers, a passageway in the member outside of the annular chamber connecting the spaced end chambers, a fluid filling the chambers and passageways of said closed member, and a sensitive element located in the annular chamber of said member with predetermined clearances therewith supported by the fluid in a floating condition for movement along the axis, the passageways and connecting end chambers providing a thermal gradient correcting fluid bypass around the annular chamber, the thermal gradient correction being determined by the ratio between the transverse cross sectional areas of the inside and outside passageways, and means for rotating said member.

8. An accelerometer of the character claimed in claim 7 in which the inside fluid bypass passageway is of circular transverse cross section with an axis coincident with the axis of the member, and the outside fluid bypass passageway is provided by a plurality of equiangularly spaced, parallel tubes of axial lengths substantially corresponding to the axial length of the annular chamber.

9. In an accelerometer, a closed member with an axis having axially spaced, end chambers, an annular chamber in said member concentric to the axis connecting the spaced end chambers, a passageway in the member to the inside of the annular chamber connecting the spaced end chambers, a passageway in the member outside of the annular chamber connecting the spaced end chambers, a fluid filling the chambers and passageways of said closed member, and a sensitive element located in the annular chamber of said member with predetermined clearances therewith supported by the fluid in a floating condition for movement along the axis, the passageways and connecting end chambers providing a scale factor correcting fluid bypass around the annular chamber, the scale factor correction being determined by the transverse cross sectional area of the passageways.

10. In an accelerometer, a closed member with an axis having axially spaced, end chambers, an annular chamber in said member concentric to the axis connecting the spaced end chambers, a passageway in the member to the inside of the annular chamber connecting the spaced end chambers, a passageway in the member outside of the annular chamber connecting the spaced end chambers, a fluid filling the chambers and passageways of said closed member, a sensitive element located in the annular chamber of said member with predetermined clearances therewith supported by the fluid in a floating condition for movement along the axis, the passageways and connecting end chambers providing a thermal gradient correcting fluid bypass around the annular chamber, the thermal gradient correction being determined by the ratio between the transverse cross sectional areas of the inside and outside passageways, and means for rotating the member about the axis.

11. In an accelerometer, a closed member with an axis having axially spaced, end chambers, an annular chamber in said member concentric to the axis connecting the spaced end chambers, a passageway in the member to the inside of the annular chamber connecting the spaced end chambers, a passageway in the member outside of the annular chamber connecting the spaced end chambers, a fluid filling the chambers and passageways of said closed member, and a sensitive element located in the annular chamber of said member with predetermined clearances therewith supported by the fluid in a floating condition for movement along the axis, the passageways and connecting end chambers providing a scale factor and thermal gradient correcting fluid bypass around the annular chamber, the first of which is determined by the transverse cross sectional area of the passageways and the second of which is determined by the ratio between the relative transverse cross sectional areas of the inside and outside passageways, and means for rotating the member about the axis.

12. In an accelerometer, a closed member with an axis having axially spaced, end chambers, an annular chamber in said member concentric to the axis connecting the spaced end chambers, a passageway in the member connecting the spaced end chambers, a fluid filling the chambers and passageway of said closed member, and a sensitive element located in the annular chamber of said member with predetermined clearances therewith supported by the fluid in a floating condition for movement along the axis, the passageway and connecting end chambers providing a scale factor correcting fluid bypass around the annular chamber, the scale factor correction being determined by the transverse cross sectional area of the passageway.

References Cited in the file of this patent

UNITED STATES PATENTS

| | | |
|---|---|---|
| 2,332,994 | Draper | Oct. 26, 1943 |
| 2,835,774 | Statham | May 20, 1958 |
| 2,840,366 | Wing | June 24, 1958 |